Patented Oct. 14, 1941

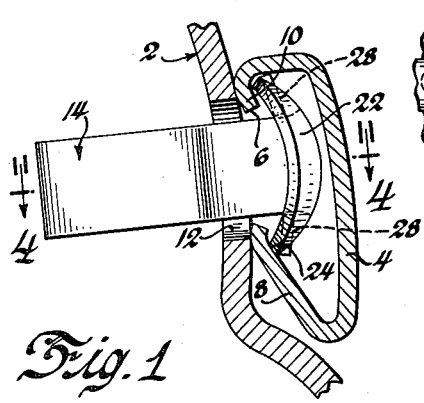
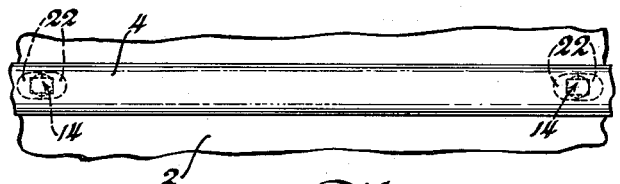
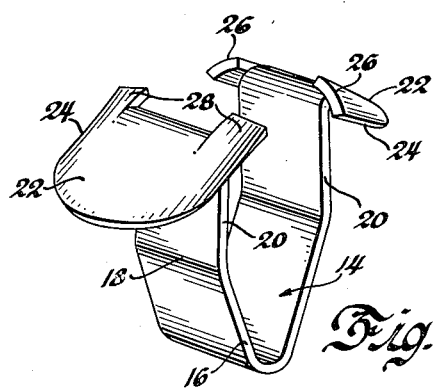
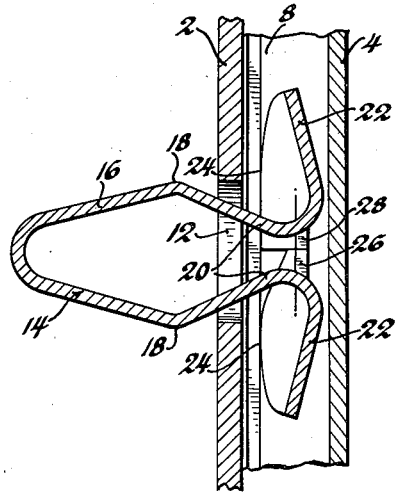
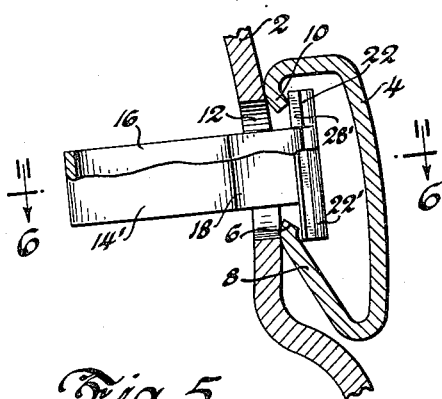
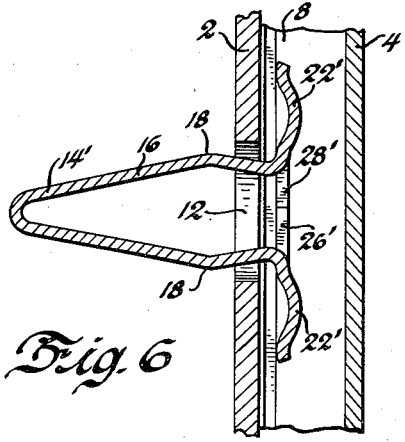

2,258,742

UNITED STATES PATENT OFFICE 2,258,742

MOLDING CLIP

Bart Cotter, Detroit, Mich., assignor to General Motors Corporation, Detroit, Mich., a corporation of Delaware Application January 2, 1940, Serial No. 312,088

5 Claims. (Cl. 24—73)

This invention relates to spring clips and has particular reference to a clip used in automotive practice to retain a molding on an automobile body.

The essential novelty of the invention resides in the provision of fingers on laterally extending arms at the end of a V-shaped part of the clip. The fingers project toward each other and have their ends twisted, the fingers facing each other being twisted in the opposite direction to give a longer line of possible contact. The purpose of these fingers is to prevent the free or open ends of the clip from being moved too close together and also to form a larger contact surface with the molding at the sides of the arms.

On the drawing:

Figure 1 is a sectional view through the side of a suitable object, such as an automobile body, showing the clip of the invention applied.

Figure 2 is a view in elevation showing the molding held to an object.

Figure 3 is a perspective view of the novel clip.

Figure 4 is a sectional view on the line 4—4 of Figue 1.

Figure 5 is a sectional view similar to Figure 1 with parts broken away and showing a modification of the clip.

Figure 6 is a section on the line 6—6 of Figure 5.

Referring to the drawing, the numeral 2 indicates a suitable object, such as the body of an automobile, to which a molding 4 is to be applied. The molding has an open side 6 facing the body and lateral flanges 8 and 10 at the sides of the open side. The automobile body 2 has a plurality of openings 12 over which the molding is to be applied, and the molding is held in place by a plurality of clips 14. The clip of the invention has the more or less V-shaped part 16 which passes through the opening 12 and this V-shaped part has the projecting shoulders 18 which are adapted to engage with the edge of the opening 12 to hold the clip in place.

The upper ends 20 of the V-shaped part 16 are bent toward each other as best shown in Figure 4, and at the ends of parts 20 lateral arms 22 are formed and these arms project away from the main part of the clip. The arms 22 are arched or rounded longitudinally as is best seen in Figure 1 and the edges 24 of the arched part are adapted to engage with the flanges 8 and 10 of the molding to hold the molding in place.

By referring to Figures 1 and 3, it will be noted that the arms 22 are wider than the V-shaped part 16 and project laterally away therefrom. At the line of junction between parts 20 and the arms 22 integral inwardly projecting fingers 26 and 28 are formed. These fingers are continuations of and substantially in the same plane with the arms 22 and have their ends twisted or turned, the twist or turn of the fingers 26 being in a direction opposite to the twist or turn of its opposing fingers 28. The reason for this opposing twist is to give a larger line or arc of possible contact so that when parts 20 are bent toward each other there is a greater assurance that the ends of the fingers will strike or engage each other. If the ends were not twisted in some instances it would be possible that one finger 26 would pass over or under its facing finger 28 and thus enable parts 20 to be moved toward each other a distance greater than desired.

Additionally, one finger 26 and one finger 28 will form an additional contact surface with the flanges 8 and 10, the reason being that one finger is twisted downwardly or toward the flange whereas the other finger will be bent away from the flanges as shown by the finger 26 in Figure 4.

The clip 14' in Figures 5 and 6 has the head part comprising the arms 22' and the fingers 26' and 28' but the shape is slightly different and the fingers 26' and 28' are not twisted or turned, but in other respects the clip is the same. The arms 22' are arched or rounded transversely but not longitudinally as is best shown in Figure 6.

To apply the clip and molding the clips 14 or 14' are first positioned in the molding 4. This is done by sliding them lengthwise in the molding from one end thereof. The molding is then applied to the body and the V-shaped part 16 of the clip pressed into one of the openings 12. By pressing on the molding 4 the engagement of the inclined side of part 16 of the clip with the edge of the opening 6 will force the end parts 20 toward each other and force the ends of the fingers 26 and 28 into contact with each other. Additional pressure on the molding will then force the V-shaped part 16 through the opening by forcing the arms of part 16 toward each other. As soon as the projections 18 pass the opposite side of the opening, the V-shaped part 16 will spread and cause the edges of parts 20 to engage with the sides of the opening. When the clip is in its final position as shown in Figure 4, the springiness in the arms of the V-part 16 will force the arms 22 apart but not to the extent that the fingers 26 and 28 will be spaced from each other, but the final position will be as shown in Figures 4 and 6. Any effort made to remove the molding 4 will be resisted by the contact of the fingers 26 and 28 with each other as soon as an effort is made to withdraw the clip 14 from the opening 12. The provision of the fingers 26 and 28 has made it possible to use a clip which will be more difficult to remove and will all the more securely hold the molding in place.

1. In a metallic clip for securing a molding or the like in place on an object, a body part capable of being passed through and retained in an opening in the object, lateral arms on the body part, said arms each comprising a single thickness of metal and having their ends projecting away from each other and engaging and holding the molding or the like to hold it to the object, fingers on the arms forming continuations of the outside edges thereof, said fingers extending directly toward each other and being substantially co-planar with the arms, said fingers in the final position of the clip adapted to have their end edge faces in abutting relation to prevent too close an approach of the arms to each other.

2. In a metallic clip for securing a molding or the like in place on an object, a generally V-shaped body part capable of being passed through and retained in an opening in the object, laterally projecting arms on the ends of the legs of the V, said arms each comprising a single thickness of metal and having their ends projecting away from each other and being curved and adapted to engage and hold the molding or the like, fingers on the arms projecting directly toward each other, said fingers forming continuations of the outside edges of the arms and being substantially co-planar with the arms, said fingers adapted to have their end edge faces in abutting relation when the arms of the V are pressed toward each other to limit the inward movement of the arms.

3. In a metallic clip for securing a molding or the like in place on an object, a generally V-shaped body part capable of being passed through and retained in an opening in the object, laterally projecting arms on the ends of the legs of the V, said arms each comprising a single thickness of metal and having their ends projecting away from each other and being curved and adapted to engage and hold the molding or the like, fingers on the arms, said fingers forming continuations of the outside edges of the arms and being substantially co-planar with the arms, said fingers projecting directly toward each other and adapted to have their end edge faces in abutting relation to limit the movement of the arms when the arms of the V are pressed toward each other, the ends of said fingers being twisted thereby to cause a greater line or arc of contact with each other.

4. In a metallic clip for securing a molding or the like in place on an object, a body part capable of being passed through and retained in an opening in the object, lateral arms on the body part, said arms each comprising a single thickness of metal and having their ends projecting away from each other and being wider than the body part and engaging and holding the molding or the like to hold it to the object, said arms having edge fingers formed at the outside edges of the arms, said fingers being substantially co-planar with the arms, said fingers extending directly toward each other and adapted in the final position of the clip to have their end edge faces in abutting relation to prevent too close an approach of the arms to each other.

5. In a metallic clip for securing a molding or the like in place on an object, a body part capable of being passed through and retained in an opening in the object, lateral arms on the body part, said arms each comprising a single thickness of metal and having their ends projecting away from each other and being wider than the body part and engaging and holding the molding or the like to hold it to the object, said arms having fingers formed at the outside edges of the arms, said fingers being substantially co-planar with the arms, said fingers being twisted and having their ends extending toward each other, the fingers facing each other being twisted in opposite directions, said fingers in the final position of the clip adapted to have their end edge faces in abutting relation to prevent too close an approach of the arms to each other.

BART COTTER.